United States Patent
Madasamy et al.

(10) Patent No.: US 10,732,961 B1
(45) Date of Patent: Aug. 4, 2020

(54) SYSTEMS AND METHODS FOR PERFORMING IN-SERVICE SOFTWARE UPGRADES ON ACTIVE NETWORK DEVICES

(71) Applicant: Juniper Networks, Inc., Sunnyvale, CA (US)

(72) Inventors: Siva Madasamy, San Jose, CA (US); Shyamshankar Dharmarajan, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 163 days.

(21) Appl. No.: 15/829,893

(22) Filed: Dec. 2, 2017

(51) Int. Cl.
*G06F 9/44* (2018.01)
*G06F 8/656* (2018.01)
*G06F 8/658* (2018.01)
*H04L 12/24* (2006.01)

(52) U.S. Cl.
CPC .............. *G06F 8/656* (2018.02); *G06F 8/658* (2018.02); *H04L 41/082* (2013.01)

(58) Field of Classification Search
None
See application file for complete search history.

(56) References Cited

U.S. PATENT DOCUMENTS

| | | | | |
|---|---|---|---|---|
| 9,021,459 B1* | 4/2015 | Qu | ............................ | G06F 8/65 710/33 |
| 2003/0235195 A1* | 12/2003 | Shenoy | ............... | H04L 12/5601 370/389 |
| 2008/0103728 A1* | 5/2008 | Archer | ................ | G06F 11/3409 702/182 |
| 2012/0096250 A1* | 4/2012 | Aloni | .................... | G06F 9/4411 713/2 |

\* cited by examiner

*Primary Examiner* — Anna C Deng
(74) *Attorney, Agent, or Firm* — FisherBroyles, LLP

(57) ABSTRACT

A disclosed method may include (1) identifying an old version of software that is running on a network device, (2) receiving a new version of the software that is to replace the old version of the software during an in-service software upgrade, and then (3) performing the in-service software upgrade on the network device by making a system call that (A) loads the new version of the software onto the network device as the old version of the software continues to run and (B) transfers control of the network device from the old version of the software to the new version of the software by booting the new version of the software without shutting down the network device. Various other systems and methods are also disclosed.

10 Claims, 6 Drawing Sheets

SYSTEMS AND METHODS FOR PERFORMING IN-SERVICE SOFTWARE UPGRADES ON ACTIVE NETWORK DEVICES

BACKGROUND

Network devices (such as routers and switches) are often used to forward traffic within a network and/or across networks. These network devices may employ software that occasionally needs updating to fix certain bugs and/or improve performance. For example, a network device may include and/or execute an operating system that manages certain hardware and/or software resources. In this example, the network device may receive a software upgrade that is intended to patch a newly discovered security vulnerability, improve the operating system's performance, and/or provide support for new software across multiple platforms running the same operating system.

Unfortunately, the execution of traditional software upgrades may force network devices to shut down and reboot, thereby resulting in a certain amount of downtime during which the network devices are unable to forward traffic. Such downtime may be an undesirable but necessary side effect of the traditional software upgrades.

However, in the event that the traffic being forwarded by the network devices is critical and/or highly important, such downtime may simply be unacceptable. In those situations, in-service software upgrades may enable the network devices to upgrade their operating systems without shutting down to reboot. As a result, the network devices may be able to continue facilitating traffic without much, if any, disruption during the in-service software upgrades.

Unfortunately to support traditional in-service software upgrades, network devices may need certain redundant hardware (such as redundant routing engines and/or redundant linecards). This redundant hardware may increase the manufacturing costs of the network devices. The instant disclosure, therefore, identifies and addresses a need for additional and improved systems and methods for performing in-service software upgrades on active network devices.

SUMMARY

As will be described in greater detail below, the instant disclosure generally relates to systems and methods for performing in-service software upgrades on active network devices. In one example a method for accomplishing such a task may include (1) identifying an old version of software that is running on a network device, (2) receiving a new version of the software that is to replace the old version of the software during an in-service software upgrade, and then (3) performing the in-service software upgrade on the network device by making a system call that (A) loads the new version of the software onto the network device as the old version of the software continues to run and (B) transfers control of the network device from the old version of the software to the new version of the software by booting the new version of the software without shutting down the network device.

Similarly, a system that implements the above-described method may include various modules that are stored in memory and executed by at least one physical processing device. For example, the system may include (1) an identification module that identifies an old version of software that is running on a network device, (2) a receiving module that receives a new version of the software that is to replace the old version of the software during an in-service software upgrade and (3) an upgrade module that performs the in-service software upgrade on the network device by making a system call that (A) loads the new version of the software onto the network device as the old version of the software continues to run and (B) transfers control of the network device from the old version of the software to the new version of the software by booting the new version of the software without shutting down the network device.

In addition, a network device that implements the above-described method may include a storage device that stores an old version of software that runs on the network device. In this example, the network device may also include a physical processing device that is communicatively coupled to the storage device. The physical processing device may (1) identify the old version of software that is running on the network device, (2) receive a new version of the software that is to replace the old version of the software during an in-service software upgrade, and (3) perform the in-service software upgrade on the network device by making a system call that (A) loads the new version of the software onto the network device as the old version of the software continues to run and (B) transfers control of the network device from the old version of the software to the new version of the software by booting the new version of the software without shutting down the network device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
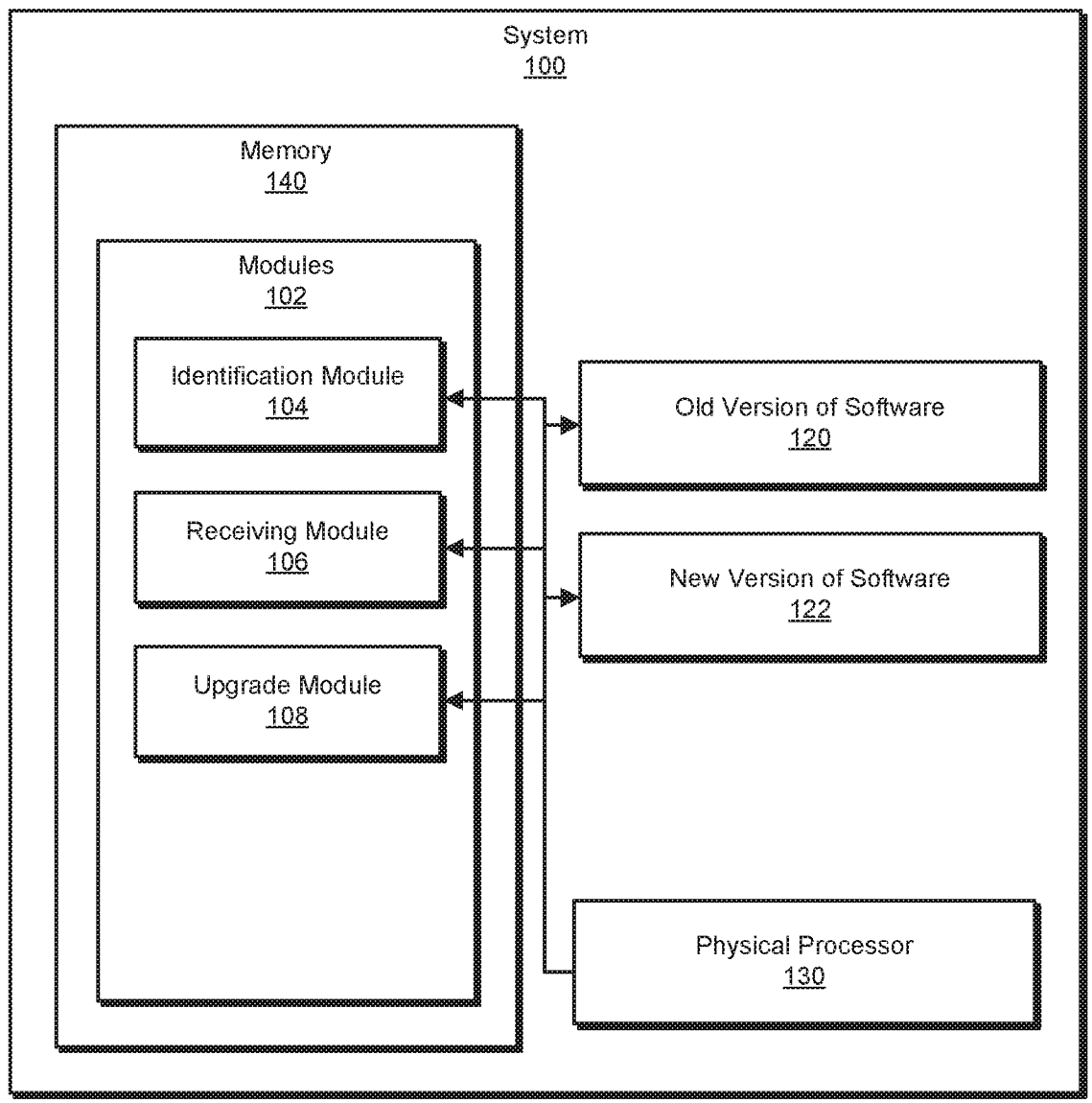
FIG. 1 is a block diagram of an exemplary system for performing in-service software upgrades on active network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather the instant disclosure covers all modifications, equivalents, and alternatives falling within the scope of the appended claims.

DETAILED DESCRIPTION OF EXEMPLARY EMBODIMENTS

The present disclosure describes various systems and methods for performing in-service software upgrades on active network devices. As will be explained in greater detail below, embodiments of the instant disclosure may enable network devices to perform in-service software upgrades without the need for certain redundant hardware (such as redundant routing engines and/or redundant linecards). Accordingly, by mitigating and/or eliminating the need for such redundant hardware, embodiments of the instant disclosure may enable network equipment manufacturers to save on the cost of materials and/or manufacturing in the production of network devices capable of performing in-service software upgrades.

The term "in-service software upgrade," as used herein and sometimes abbreviated as "ISSU," generally refers to a software update, fix, patch, and/or upgrade that is performed on a network device without forcing the network device to shut down and reboot. In one example, an in-service software upgrade may enable a network device to update and/or upgrade its operating system without re-initializing the hardware via the Basic Input/Output System (BIOS). As a result, the network device may implement the in-service software upgrade with only minimal, if any, disruption to the flow of traffic. In-service software upgrades are sometimes also referred to as hitless upgrades.

The following will provide, with reference to FIGS. 1, 2, 4, and 5, detailed descriptions of exemplary systems for performing in-service software upgrades on active network devices. Detailed descriptions of corresponding computer-implemented methods will be provided in connection with FIG. 3. In addition, detailed descriptions of an exemplary computing system for carrying out these methods will be provided in connection with FIG. 6.

FIG. 1 is a block diagram of an exemplary system 100 for performing in-service software upgrades on active network devices. As illustrated in this figure, exemplary system 100 may include one or more modules 102 for performing one or more tasks. As will be explained in greater detail below, modules 102 may include an identification module 104, a receiving module 106, and an upgrade module 108. Although illustrated as separate elements, one or more of modules 102 in FIG. 1 may represent portions of a single module or application (such as old version of software 120 and/or new version of software 122).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network device 202 and/or server 206). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to perform in-service software upgrades on active network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include certain software, such as old version of software 120 and/or new version of software 122. In some examples, old version of software 120 may include and/or represent an operating system. For example, old version of software 120 may include and/or represent a monolithic operating system that runs in kernel space on a network device. The term "monolithic operating system," as used herein, generally refers to an operating system that runs and/or operates entirely within kernel space. Examples of monolithic operating systems include, without limitation, LINUX operating systems, UNIX operating systems, Berkeley Software Distribution (BSD) operating systems (such as FreeBSD), OPENVMS operating systems, general-purpose operating systems, variations or combinations of one or more of the same, and/or any other suitable operating systems.

Additionally or alternatively, old version of software 120 may include and/or represent one or more software modules. For example, old version of software 120 may include and/or represent certain applications, programs, and/or software components that run and/or operate in user space on a network device.

The term "user space," as used herein, generally refers to any type or form of memory and/or address space that has been designated for and/or allocated to application software and/or components. The term "kernel space," as used herein, generally refers to any type or form of memory and/or address space that has been designated for and/or allocated to an operating system kernel and/or operating system components. In one example, user space and kernel space may include and/or represent mutually exclusive virtual memory allocations and/or execution contexts that are separate and/or segregated from one another.

In some examples, new version of software 122 may include and/or represent an operating system that is to replace an outdated version of the same operating system. For example, new version of software 122 may include and/or represent an operating system kernel that is to run and/or operate in kernel space on a network device. Additionally or alternatively, new version of software 122 may include and/or represent one or more software modules. For example, new version of software 122 may include and/or represent certain applications, programs, and/or software components that run and/or operate in user space on a network device.

Figure 2:
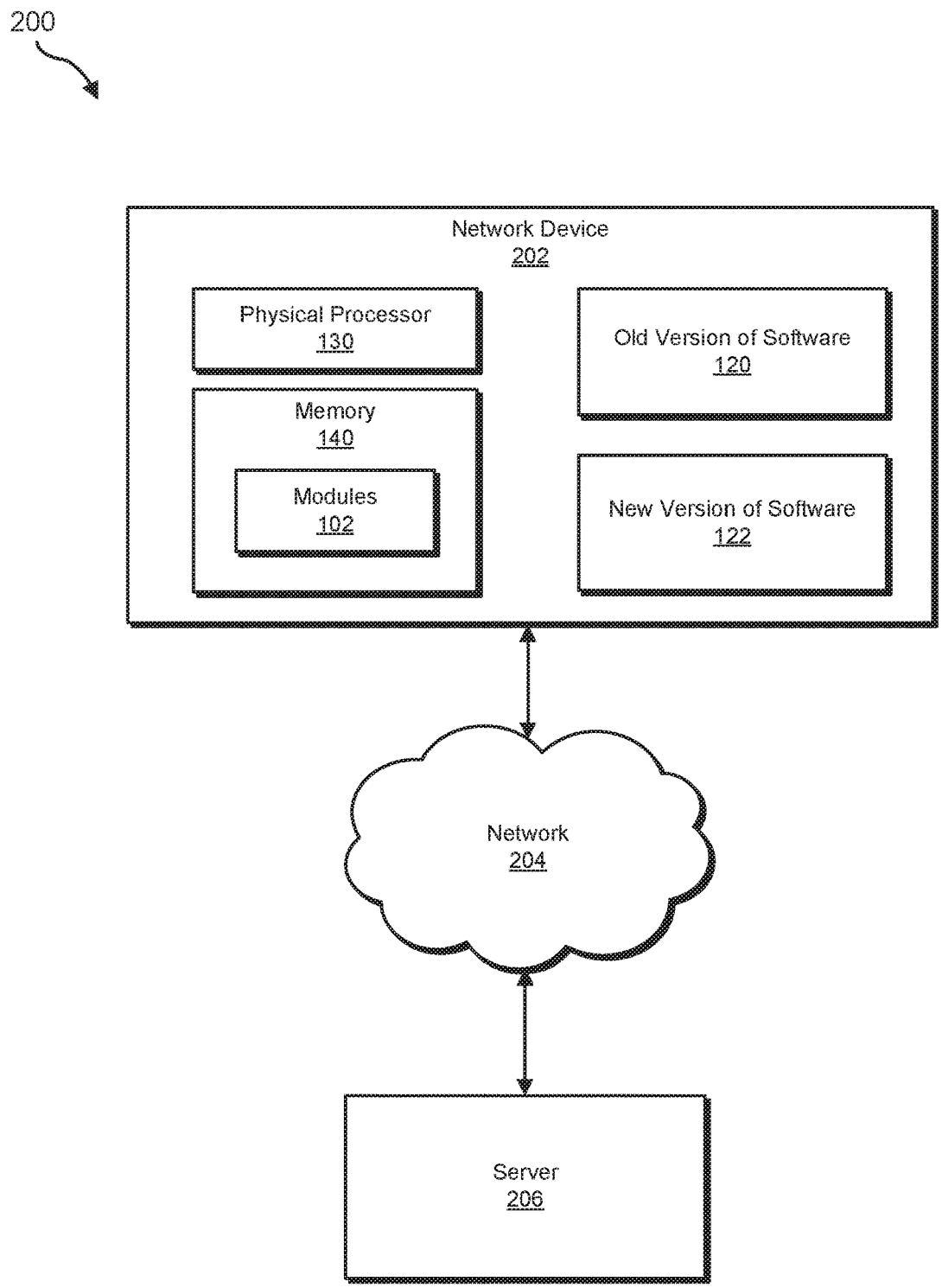
FIG. 2 is a block diagram of an exemplary system for performing in-service software upgrades on active network devices.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include a network device 202 in communication with a server 206 via a network 204. In one example, all or a portion of the functionality of modules 102 may be performed by network device 202, server 206, and/or any other suitable computing system (whether or not illustrated in FIG. 2). As will be described in greater detail below, one or more of modules 102 from FIG. 1 may, when executed by at least one physical processor of network device 202 and/or server 206, enable network device 202 and/or server 206 to efficiently perform in-service software upgrades on active network devices.

For example, and as will be described in greater detail below, one or more of modules 102 may cause network device 202 to (1) identify the old version of software that is running on the network device, (2) receive a new version of the software that is to replace the old version of the software during an in-service software upgrade, and (3) perform the in-service software upgrade on the network device by making a system call that (A) loads the new version of the software onto the network device as the old version of the software continues to run and (B) transfers control of the network device from the old version of the software to the new version of the software by booting the new version of the software without shutting down the network device.

Network device 202 generally represents any type or form of physical computing device that forwards traffic within a network and/or across networks. In one example, one or more of network devices 202(1) and 202(2) may include and/or represent a router, such as a Customer Edge (CE) router, a Provider Edge (PE) router, a hub router, a spoke router, an Autonomous System (AS) boundary router, and/or an area border router. Additional examples of network devices 202(1) and 202(2) include, without limitation, switches, hubs, modems, bridges, repeaters, gateways, network racks and/or chassis, portions of one or more of the same, combinations or variations of one or more of the same, and/or any other suitable network devices. Although FIG. 2 illustrates only one labelled network device, other embodiments may involve and/or incorporate various additional network devices and/or computing devices.

Server 206 generally represents any type or form of computing device capable of performing in-service software upgrades on active network devices. In one example, server 206 may include and/or represent a security server, software server, or web server that manages and/or distributes in-service software upgrades. Additional examples of server 206 include, without limitation, application servers, storage servers, and/or database servers configured to run certain software applications and/or provide various web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing devices 202(1)-(N) and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although network device 202 and server 206 are illustrated as being external to network 204 in FIG. 2, these devices may alternatively represent part of and/or be included in network 204.

Figure 3:
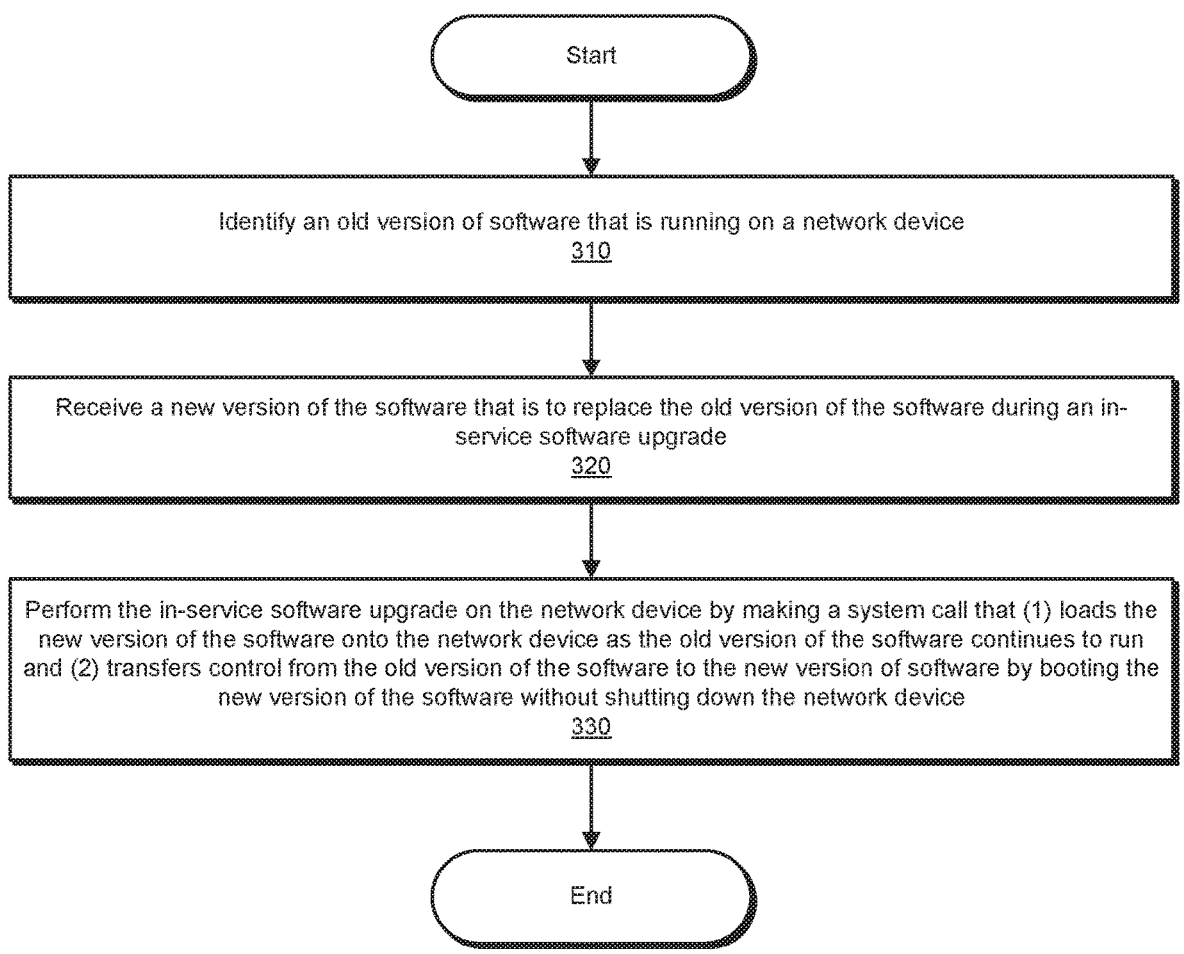
FIG. 3 is a flow diagram of an exemplary method for performing in-service software upgrades on active network devices.

FIG. 3 is a flow diagram of an exemplary computer-implemented method 300 for performing in-service software upgrades on active network devices. The steps shown in FIG. 3 may be performed by any suitable computer-executable code, computing system, and/or ASIC, including system 100 in FIG. 1, system 200 in FIG. 2, network device 202 in FIG. 4, routing engine 404(1) in FIG. 5, system 600 in FIG. 6, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify an old version of software that is running on a network device. For example, identification module 104 may, as part of network device 202 in FIG. 2 or 4, identify old version of software 120 that is running on network device 202. In this example, old version of software 120 may include and/or represent all or a portion of a monolithic operating system that is running in kernel space on network device 202. More specifically, old version of software 120 may include and/or represent an operating system kernel. Additionally or alternatively, old version of software 120 may include one or more software modules and/or applications that are running in user space on network device 202.

In some examples, old version of software 120 may be stored and/or run on a variety of different components within network device 202. For example, network device 202 may include various Field-Replaceable Units (FRUs) with one or more ports and/or interfaces that forward traffic within a network and/or across multiple networks. Examples of such FRUs include, without limitation, linecards, Physical Interface Cards (PICs), Flexible PIC Concentrators (PCs), Switch Interface Boards (SIBs), control boards, routing engines, communication ports, fan trays, connector interface panels, combinations or variations of one or more of the same, and/or any other suitable FRUs.

In such examples, all or a portion of software 120 may be stored and/or running on one or more routing engines of network device 202. In addition, all or a portion of software 120 may be stored and/or running on one or more linecards of network device 202.

The systems described herein may perform step 310 in a variety of different ways and/or contexts. In some examples identification module 104 may identify old version of software 120 by monitoring computing activity on network device 202. In one example, identification module 104 may identify old version of software 120 as old version of software 120 is installed on network device 202. In another example, identification module 104 may identify old version of software 120 as it is launched and/or begins running on network device 202.

Returning to FIG. 3, at step 320 one or more of the systems described herein may receive a new version of the software that is to replace the old version of the software during an in-service software upgrade. For example, receiving module 106 may, as part of network device 202 in FIG. 2 or 4, receive new version of software 122 that is to replace old version of software 120 during an in-service software upgrade. In this example, new version of software 122 may include and/or represent all or a portion of a monolithic operating system that is to run in kernel space on network device 202. More specifically, new version of software 122 may include and/or represent an operating system kernel. Additionally or alternatively, new version of software 122 may include one or more software modules and/or applications that are to run in user space on network device 202.

The systems described herein may perform step 320 in a variety of different ways and/or contexts. In some examples, receiving module 106 may receive new version of software 122 as part of the in-service software upgrade. For example, the software vendor who developed and/or created old version of software 120 may release new version of software 122. In this example, new version of software 122 may represent and/or constitute an update, upgrade, and/or replacement for old version of software 120. The software vendor may control server 206 and/or release or distribute new version of software 122 from server 206.

Accordingly server 206 may send, transmit, and/or deliver new version of software 122 to network device 202 via network 204. By doing so, server 206 may enable to network device 202 to perform, implement, and/or execute an in-service software upgrade in which new version of software 122 replaces old version of software 120.

In some examples, receiving module 106 may receive new version of software 122 at network device 202 without solicitation. In other words, server 206 may send, transmit, and/or deliver new version of software 122 even though network device 202 never solicited and/or requested new version of software 122. In different examples, receiving module 106 may receive new version of software 122 at network device 202 after network device 202 has solicited and/or requested new version of software 122 from server 206. In these examples, server 206 may send, transmit, and/or deliver new version of software 122 in response to the solicitation and/or request from network device 202.

Returning to FIG. 3, at step 330 one or more of the systems described herein may perform the in-service software upgrade on the network device. For example, upgrade module 108 may, as part of network device 202 in FIG. 2 or 4, perform the in-service software upgrade by making a system call. In this example, the system call may effectively load new version of software 122 onto network device 202 as old version of software 120 continues to run on network device 202. The system call may also transfer control of network device 202 from old version of software 120 to new version of software 122 by booting new version of software 122 without shutting down network device 202 and/or reinitializing the hardware via certain firmware (such as the BIOS).

Although much of the instant disclosure is directed and/or refers to network device 202 as a whole many of the embodiments disclosed herein may also be performed and/or satisfied in connection with one or more components of network device 202, as opposed to network device 202 as a whole. As a specific example, old version of software 120 may be stored and/or running on a master routing engine, a backup routing engine, and/or one or more linecards of network device 202. In this example, new version of software 122 may be intended and/or designed to replace old version of software 120 in some or all of those components of network device 202 as part of the in-service software upgrade. Accordingly, the in-service software upgrade may include and/or involve updating or upgrading old version of software 120 to new version of software 122 on the master routing engine, the backup routing engine, and/or one or more of the linecards of network device 202.

The systems described herein may perform step 330 in a variety of different ways and/or contexts. In some examples, upgrade module 108 may perform the in-service software upgrade on network device 202 by invoking a kernel execution system call (such as LINUX's "kexec" system call and/or FreeBSD's "kload" system call). For example, network device 202 may include a general-purpose monolithic LINUX operating system, which represents all or a portion of old version of software 120. In this example, upgrade module 108 may make a "kexec" system call that is specific to the LINUX operating system.

This "kexec" system call may direct network device 202 to boot the updated and/or upgraded LINUX operating system included in new version of software 122 from the previous LINUX operating system included in old version of software 120. This "kexec" system call may skip and/or forgo the bootloader stage and/or hardware-initialization stage performed by the firmware of network device 202. Examples of such firmware include, without limitation, BIOSes, universal boot loaders (such as U-Boot), combinations or variations of one or more of the same, and/or any other suitable firmware.

In another example, network device 202 may include a general-purpose monolithic FreeBSD operating system, which represents all or a portion of old version of software 120. In this example, upgrade module 108 may make a "kload" system call that is specific to the FreeBSD operating system. This "kload" system call may direct network device 202 to boot the updated and/or upgraded FreeBSD operating system included in new version of software 122 from the previous FreeBSD operating system included in old version of software 120. This "kload" system call may skip and/or forgo the bootloader stage and/or hardware-initialization stage performed by the firmware of network device 202.

In some examples, the firmware on network device 202 may be responsible for the bootloader stage and/or initializing the hardware at power-on startup. Accordingly, since the system call made by upgrade module 108 boots new version of software 122 without invoking that firmware, the in-service software upgrade performed by upgrade module 108 may avoid shutting and/or powering down network device 202. In doing so, the in-service software upgrade may be able to facilitate the transfer of control from old version of software 120 to new version of software 122 without much if any, disruption to the flow of traffic passing through network device 202. In other words, the in-service software upgrade may be completed by transferring control of network device 202 from old version of software 120 to new version of software 122 without much, if any, downtime.

Moreover, by making the system call that (1) loads new version of software 122 onto network device 202 as old version of software 120 continues to run and (2) transfers control of network device 202 from old version of software 120 to new version of software 122 by booting new version of software 122 without shutting down network device 202 and/or invoking the hardware-initialization firmware, this new type of in-service software upgrade may effectively mitigate and/or eliminate the need for certain redundant hardware (such as redundant routing engines and/or redundant linecards), thereby enabling the manufacturer of network device 202 to save on the cost of materials and/or manufacturing.

Figure 4:
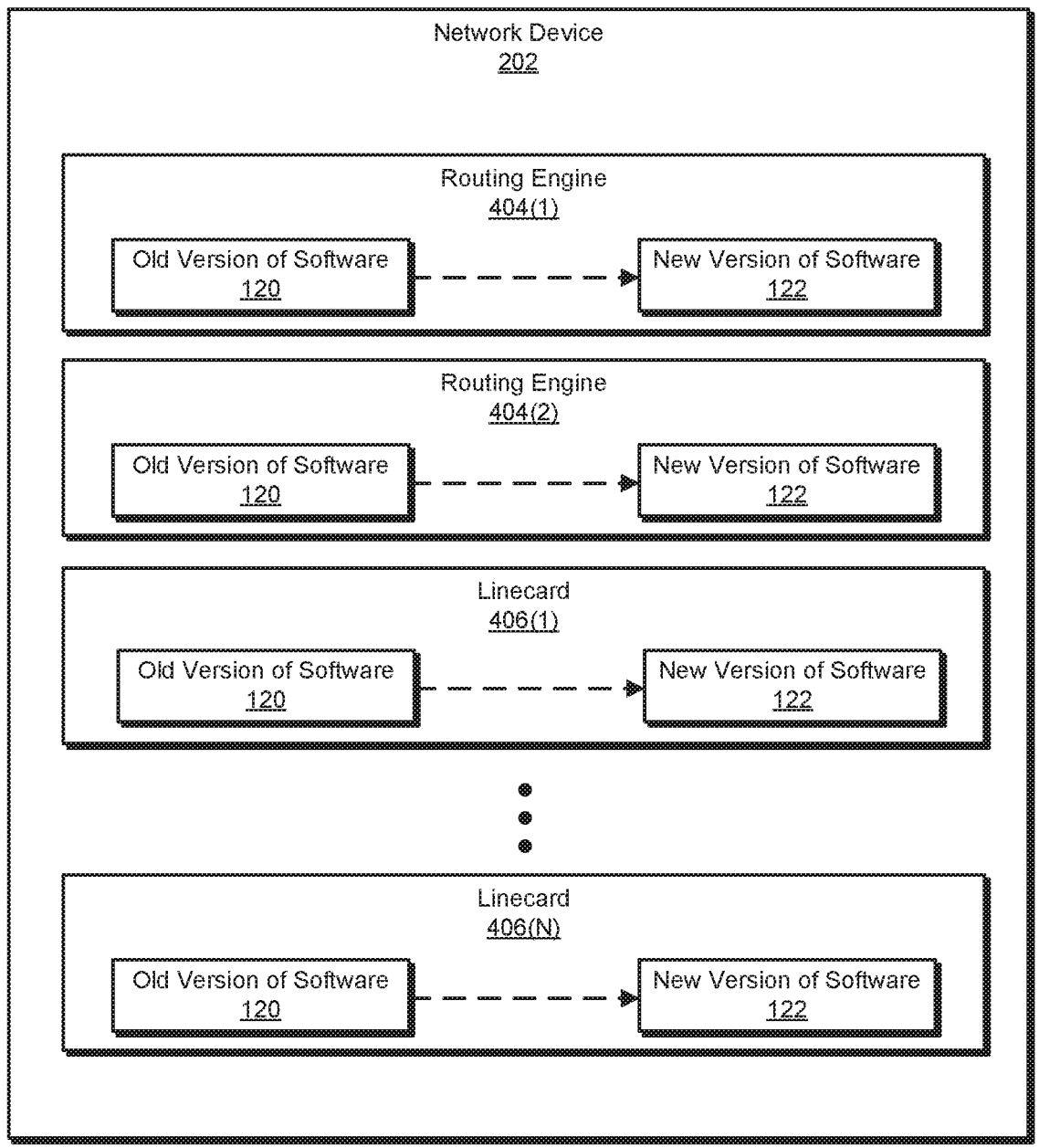
FIG. 4 is a block diagram of an exemplary network device that performs an in-service software upgrade.

Although the systems and methods described herein may enable network devices to perform in-service software upgrades without the need for certain redundant hardware (such as routing engines and/or redundant linecards), some embodiments may nonetheless include and/or involve redundant hardware to provide other benefits and/or advantages (e.g., failover and/or high availability). FIG. 4 illustrates an exemplary implementation of network device 202 that includes redundant hardware. As illustrated in FIG. 4, network device 202 may include a routing engine 404(1), a routing engine 404(2), and linecards 406(1)-(N). Each of routing engines 404(1) and 404(2) and linecards 406(1)-(N) may include, store, and/or execute all or a portion of old version of software 120. In one example, routing engines 404(1) and 404(2) and linecards 406(1)-(N) may each include, store, and/or execute a different instance of the same old version of software 120. Additionally or alternatively, routing engines 404(1) and 404(2) and linecards 406(1)-(N) may each include, store, and/or execute a different portions of a single instance of old version of software 120.

In one example, network device 202 may receive and/or obtain new version of software 122 from server 206 via network 204. In this example, new version of software 122 may be intended and/or designed to replace old version of software 120 in all of routing engines 404(1) and 404(2) and linecards 406(1)-(N) on network device 202. More specifically new version of software 122 may include and/or represent an upgraded LINUX operating system kernel.

Upon receiving and/or obtaining new version of software 122, network device 202 may initiate and/or implement an in-service software upgrade—beginning with routing engine 404(1). In this example, routing engine 404(1) may represent a backup routing engine of network device 202, and routing engine 404(2) may represent a master routing engine of network device 202. Network device 202 may load the new version of the software in preparation for a switchover from the old version of the software. In addition, routing engine 404(1) may download certain critical data from routing engine 404(2) so as to synchronize routing engines 404(1) and 404(2). In other words, routing engine 404(1) may assume the role of master from routing engine 404(2) in the switchover and thus take control of network device 202 with respect to routing responsibilities.

Upon completion of the upgrade on routing engine 404 (1), linecards 406(1)-(N) may all download the upgraded LINUX operating system kernel from routing engine 404(1) in parallel. In some examples, network device 202 may load and/or stage the upgraded LINUX operating system kernel on one or more of linecards 406(1)-(N). Network device 202 may also load and/or stage certain applications in user space on one or more of linecards 406(1)-(N). In one example, the loading and/or staging of the upgraded LINUX operating system kernel may be initiated and/or performed by making and/or executing a system call (such as LINUX's "kexec" system call and/or FreeBSD's "kload" system call). In this example, the system call may directly load the upgraded LINUX operating system kernel into main memory on one or more of linecards 406(1)-(N) and/or begin executing the upgraded LINUX operating system kernel on one or more of linecards 406(1)-(N). Additionally or alternatively, the system call may cause one or more of linecards 406(1)-(N) to skip the BIOS, postpone at least a portion of the operating system initialization, and then launch the upgraded LINUX operating system kernel quickly to restore the host path (if ASIC-based forwarding is implemented) or the data path (if software-based forwarding is implemented).

Linecards 406(1)-(N) may then launch and/or execute the upgraded networking software. By doing so, network device 202 may be able to continuously forward traffic to other network devices and/or computing devices throughout the in-service software upgrade.

Upon completion of the upgrade on linecards 406(1)-(N), routing engine 404(2) may relinquish its control and/or mastership over network device 202 to routing engine 404(1) since routing engine 404(1) has already completed the upgrade. Accordingly, network device 202 may effectively transfer control from routing engine 404(2) to routing engine 404(1). By doing so, network device 202 may be able to continuously forward traffic to other network devices and/or computing devices throughout the in-service software upgrade.

Routing engine 404(2) may then download the new networking software from routing engine 404(1). Routing engine 404(2) may also install the new networking software as part of the in-service software upgrade. In addition, due to the switchover, routing engine 404(2) may assume the role of backup routing engine.

In some examples, as part of the in-service software upgrade process, the old version of software may direct network device 202 to download the new version of software. Upon completion of the download, network device 202 may install the new version of software and prepare the new version of software for execution by capturing a minimal state of the old operating system. This minimal state of the operating system may include, without limitation, one or more interface configurations and/or console settings. These download, install, and capture processes may be performed and/or executed while the old version of software is still running on network device 202.

In such examples, network device 202 may use the "kexec" system call to transfer control from the old version of software to the new version of software. This "kexec" system call may launch the new version of the operating system without power-cycling network device 202. During the operating system bootup, network device 202 may execute a relaunch component prior to completion of the operating system initialization. This relaunch component may replay and/or implement the minimum state of the operating system that was captured during the preparation phase. This relaunch component may also launch the networking software in the in-service software upgrade mode. After the launch, the networking software may initialize and/or resume the forwarding (by way of the host path and/or the data path) while the rest of the operating system initialization continues in the background. By skipping the power-cycling, the BIOS, and the complete operating system initialization in this way, the networking software may ensure that any losses in the host path and/or the data path are minimal and/or nominal.

Figure 5:
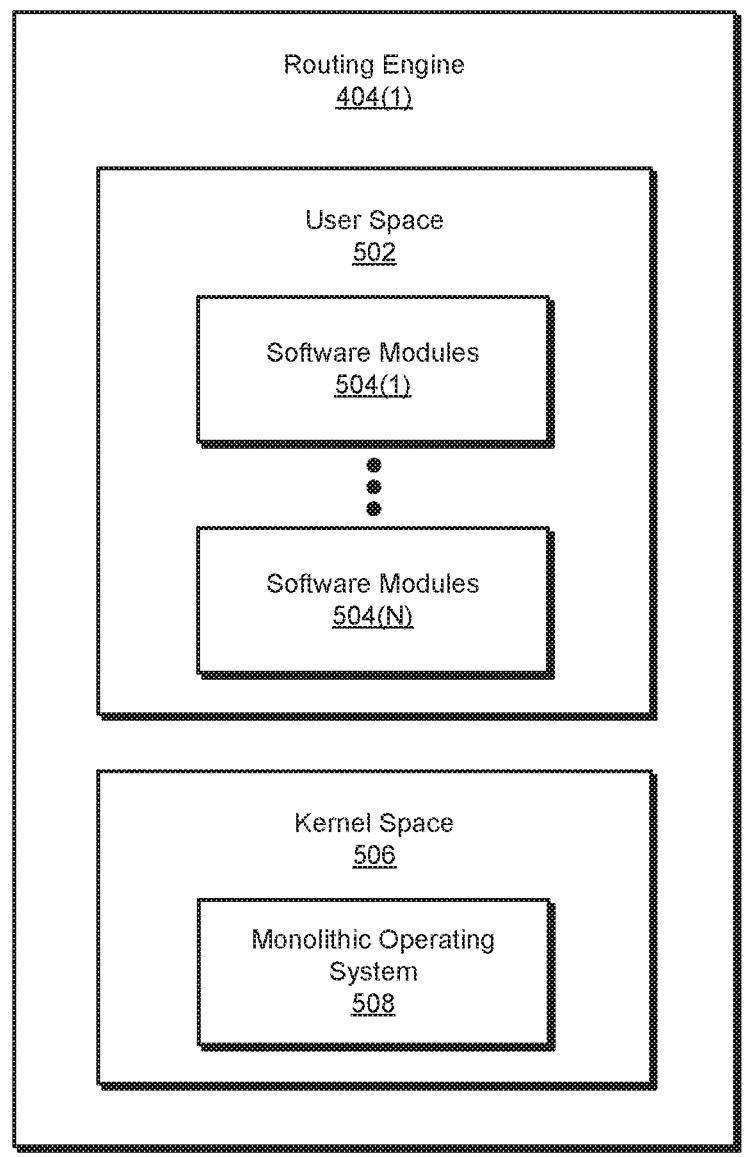
FIG. 5 is a block diagram of an exemplary routing engine on a network device that performs an in-service software upgrade.

FIG. 5 illustrates an exemplary implementation of routing engine 404(1). As illustrated in FIG. 5, routing engine 404(1) may include user space 502 and kernel space 506. In this example, software modules 504(1)-(N) may be stored and/or run in user space 502, and monolithic operating system 508 may be stored and/or run in kernel space 506. Software modules 504(1)-(N) and/or monolithic operating system 508 may represent all or portions of old version of software 120 and/or new version of software 122. Although not illustrated in FIG. 5, routing engine 404(2) and/or linecards 406(1)-(N) in FIG. 4 may have similar configurations and/or software architectures as routing engine 404(1) in FIG. 5.

In one example, network device 202 may implement ASIC-based forwarding, as opposed to software-based forwarding. In such examples, the software upgrade may be directed to the processors on routing engine and/or linecards rather than ASICs. In other words, the ASICs may avoid being reset during the software upgrade.

Figure 6:
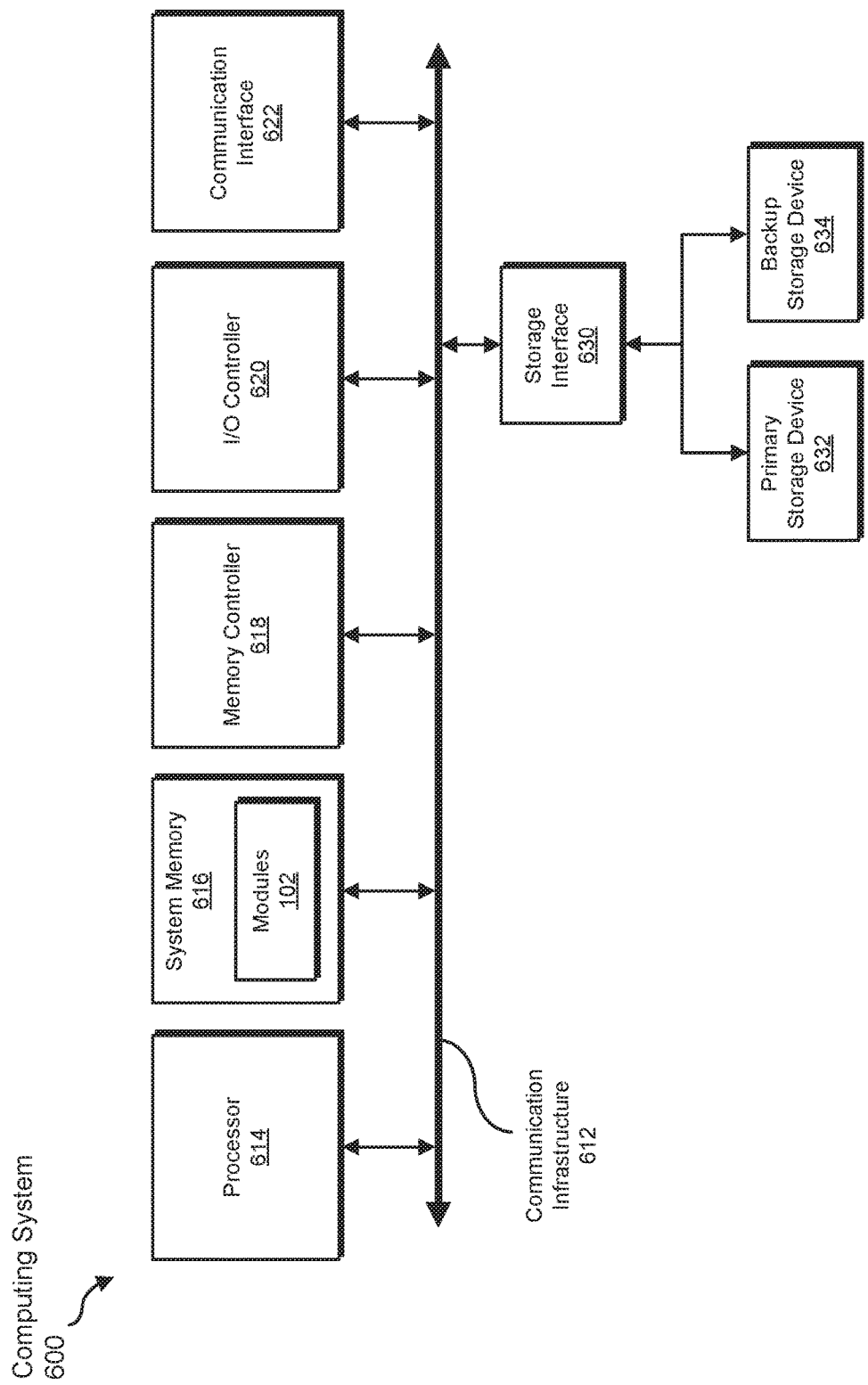
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods or processes described and/or illustrated herein. In one example, computing system 600 may include, represent, and/or implement exemplary system 100 from FIG. 1.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC) a system on a chip (e.g., a network processor), a hardware accelerator, a general-purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (DATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
identifying an old version of software that is running on a plurality of field-replaceable units of a network device, wherein the plurality of field-replaceable units comprises:
a master routine engine that currently routes traffic for the network device;
a backup routine engine; and
one or more linecards;
receiving a new version of the software that is to replace the old version of the software during an in-service software upgrade; and
performing the in-service software upgrade on the plurality of field-replaceable units of the network device by making at least one kernel execution system call that:
loads the new version of the software onto the backup routing engine as the old version of the software continues to run on the master routing engine, wherein loading the new version of the software onto the backup routing engine comprises upgrading the old version of the software on the backup routing engine to the new version of the software, and wherein upgrading the old version of the software on the backup routing engine comprises synchronizing certain critical data across the backup routing engine and the master routing engine to prepare the backup routing engine to assume control of routing the traffic for network device; and
upon loading the new version of the software onto the backup routing engine:
transfers the control of routing the traffic for the network device from the master routing engine to the backup routing engine;
downloads the new version of the software from the backup routing engine to the one or more linecards;
stages the new version of the software onto the one or more linecards by booting the new version of the software on the one or more linecards without shutting down the one or more linecards, wherein booting the new version of the software comprises skipping a bootloader stage performed by a Basic Input/Output System (BIOS) of the network device, and wherein staging the new version of the software onto the one or more linecards comprises installing the new version of the software in the one or more linecards during the in-service software upgrade; and
upon transferring the control of routing the traffic for the network device from the master routing engine to the backup routing engine, upgrading the old version of the software on the master routing engine to the new version of the software.

2. The method of claim 1, wherein transferring the control of routine the traffic for the network device comprises, upon upgrading the old version of the software on the backup routing engine and the one or more linecards, transferring the control of routine the traffic for the network device from the master routing engine to the backup routing engine.

3. The method of claim 1, wherein the software running on the plurality of field-replaceable units comprises at least one of:
a monolithic operating system that runs in kernel space; and
one or more software modules that run in user space.

4. The method of claim 3, wherein transferring the control of routing the traffic for the network device comprises transferring the control of routing the traffic for the network device from the old version of the software to the new version of the software without invoking the BIOS of the network device during the in-service software upgrade.

5. The method of claim 4, wherein performing the in-service software upgrade comprises enabling the network device to continuously forward the traffic to one or more other network devices throughout the in-service software upgrade.

6. A system comprising:
an identification module, stored in memory, that identifies an old version of software that is running on a plurality of field-replaceable units of a network device, wherein the plurality of field-replaceable units comprises:
a master routine engine that currently routes traffic for the network device;
a backup routine engine; and
one or more linecards;
a receiving module, stored in memory, that receives a new version of the software that is to replace the old version of the software during an in-service software upgrade;
an upgrade module, stored in memory, that performs the in-service software upgrade on the plurality of field-replaceable units of the network device by making at least one kernel execution system call that:
loads the new version of the software onto the backup routine engine as the old version of the software continues to run on the master routine engine;
upgrades the old version of the software on the backup routing engine to the new version of the software;
synchronizes certain critical data across the backup routing engine and the master routing engine to prepare the backup routing engine to assume control of routine the traffic for network device; and
upon loading the new version of the software onto the backup routine engine:
transfers the control of routine the traffic for the network device from the master routine engine to the backup routine engine;
downloads the new version of the software from the backup routine engine to the one or more linecards; and
stages the new version of the software onto the one or more linecards by booting the new version of the software on the one or more linecards without shutting down the one or more linecards, wherein booting the new version of the software comprises skipping a bootloader stage performed by a Basic Input/Output System (BIOS) of the network device;
installs the new version of the software in the one or more linecards during the in-service software upgrade;
upon transferring the control of routing the traffic for the network device from the master routing engine to the backup routing engine, upgrades the old version of the software on the master routing engine to the new version of the software; and
at least one physical processing device that executes the identification module, the receiving module, and the upgrade module.

7. The system of claim 6, wherein the upgrade module, upon upgrading the old version of the software on the backup routing engine and the one or more linecards, transfers the control of routing the traffic for the network device from the master routing engine to the backup routing engine.

8. The system of claim 6, wherein the software running on the plurality of field-replaceable units comprises at least one of:

a monolithic operating system that runs in kernel space; and one or more software modules that run in user space.

9. The system of claim 8, wherein the upgrade module transfers the control of routine the traffic for the network device from the old version of the software to the new version of the software without invoking the BIOS of the network device during the in-service software upgrade.

10. A network device comprising:

a storage device that stores an old version of software that runs on a plurality of field-replaceable units of the network device, wherein the plurality of field-replaceable units comprises:

a master routine engine that currently routes traffic for the network device;

a backup routine engine; and one or more linecards; and at least one physical processing device that is communicatively coupled to the storage device, wherein the physical processing device:

identifies the old version of software that is running on the field-replaceable unit of the network device;

receives a new version of the software that is to replace the old version of the software during an in-service software upgrade; and performs the in-service software upgrade on the plurality of field-replaceable units of the network device by making at least one kernel execution system call that:

loads the new version of the software onto the backup routine engine as the old version of the software continues to run on the master routine engine;

upgrades the old version of the software on the backup routing engine to the new version of the software;

synchronizes certain critical data across the backup routing engine and the master routing engine to prepare the backup routing engine to assume control of routine the traffic for network device; and upon loading the new version of the software onto the backup routine engine:

transfers the control of routing the traffic for the network device from the master routing engine to the backup routing engine;

downloads the new version of the software from the backup routing engine to the one or more linecards; and stages the new version of the software onto the one or more linecards by booting the new version of the software on the one or more linecards without shutting down the one or more linecards, wherein booting the new version of the software comprises skipping a bootloader stage performed by a Basic Input/Output System (BIOS) of the network device;

installs the new version of the software in the one or more linecards during the in-service software upgrade;

upon transferring the control of routing the traffic for the network device from the master routing engine to the backup routing engine, upgrades the old version of the software on the master routing engine to the new version of the software.

* * * * *